United States Patent
Morge et al.

(10) Patent No.: US 11,215,285 B2
(45) Date of Patent: Jan. 4, 2022

(54) SEAL DESIGN

(71) Applicant: Caterpillar Inc., Deerfield, IL (US)

(72) Inventors: Ryan Patrick Morge, Clinton, IL (US); Pradeep Chapagain, Normal, IL (US); Andrew R. Stodgel, Boonville, MO (US)

(73) Assignee: Caterpillar Inc., Peoria, IL (US)

( * ) Notice: Subject to any disclaimer, the term of this patent is extended or adjusted under 35 U.S.C. 154(b) by 258 days.

(21) Appl. No.: 16/357,433

(22) Filed: Mar. 19, 2019

(65) Prior Publication Data
US 2020/0300366 A1   Sep. 24, 2020

(51) Int. Cl.
*F16J 15/3284*   (2016.01)
*F16C 11/06*   (2006.01)
*F16J 15/3268*   (2016.01)

(52) U.S. Cl.
CPC ....... *F16J 15/3284* (2013.01); *F16C 11/0671* (2013.01); *F16J 15/3268* (2013.01)

(58) Field of Classification Search
CPC . F16J 15/3284; F16J 15/3268; F16C 11/0671; F16C 11/0666
See application file for complete search history.

(56) References Cited

U.S. PATENT DOCUMENTS

| | | | | |
|---|---|---|---|---|
| 224,695 A * | 2/1880 | Johnson | ............... | F16J 15/3284 277/439 |
| 2,198,129 A * | 4/1940 | Sanford | ............... | F16J 15/3284 92/164 |
| 2,630,357 A * | 3/1953 | Smith | ................ | F16J 15/3216 277/439 |
| 3,325,172 A * | 6/1967 | Herbold | .............. | F16J 15/3284 277/411 |
| 3,924,861 A * | 12/1975 | Szepesvary | .......... | F16J 15/3268 277/551 |
| 4,055,205 A * | 10/1977 | Withoff | ................ | F16J 15/3284 100/269.21 |
| 4,335,889 A * | 6/1982 | Cather, Jr. | ............. | B29C 33/40 277/560 |
| 4,579,352 A * | 4/1986 | Adang | ................ | F16J 15/3204 277/573 |
| 4,589,665 A * | 5/1986 | Arai | ..................... | F16J 15/3284 264/337 |
| 7,670,078 B2 * | 3/2010 | Elterman | ............ | F16C 11/0671 403/134 |

(Continued)

FOREIGN PATENT DOCUMENTS

CN   202732540 U   2/2013
CN   204628557   9/2015

(Continued)

*Primary Examiner* — Eugene G Byrd
(74) *Attorney, Agent, or Firm* — Law Office of Kurt J. Fugman LLC (57) ABSTRACT

A seal includes an at least partially cylindrical annular body defining a radial direction, an axial direction, and a circumferential direction. The at least partially cylindrical annular body has a radially outer flange, a radially inner ring, and a resilient intermediate portion joining the radially outer flange to the radially inner ring. The radially outer flange defines a seal outer diameter and a flange axial thickness, and a ratio of the seal outer diameter to the flange axial thickness ranges from 14.0 to 15.0.

19 Claims, 7 Drawing Sheets

(56) References Cited

U.S. PATENT DOCUMENTS

| | | | | |
|---|---|---|---|---|
| 7,704,007 | B2* | 4/2010 | Elterman | F16J 3/046 |
| | | | | 403/134 |
| 8,286,969 | B2* | 10/2012 | Chochua | F16J 15/164 |
| | | | | 277/418 |
| 8,622,644 | B2* | 1/2014 | Becker | F16J 15/52 |
| | | | | 403/50 |
| 9,863,464 | B2 | 1/2018 | Hosen et al. | |
| 2001/0036385 | A1* | 11/2001 | Menotti | F16C 11/0671 |
| | | | | 403/135 |
| 2014/0319780 | A1 | 10/2014 | Vertenten | |
| 2016/0097454 | A1* | 4/2016 | Chapagain | F16C 11/06 |
| | | | | 403/161 |
| 2016/0097455 | A1 | 4/2016 | Chapagain et al. | |

FOREIGN PATENT DOCUMENTS

| | | |
|---|---|---|
| GB | 877718 A | 9/1961 |
| KR | 101911813 | 10/2018 |
| WO | 2017114952 A1 | 7/2017 |

* cited by examiner

SEAL DESIGN

TECHNICAL FIELD

The present disclosure relates to a seal for a joint assembly of a machined. Specifically, the present disclosure relates to a seal member for a maintenance-free bearing of a joint assembly of an off-highway machine.

BACKGROUND

Off-highway machines have a dump body may operate in a variety of environments. Such machines can include one or more hoist cylinders configured to selectively pivot the dump body about its rear end from a horizontal position to an inclined dumping position, etc. During the dumping process, the end of the hoist cylinder that is connected to the frame of the machine can pivot about a bearing to accommodate the different orientations of the dump body. The operational efficiency of the hoist cylinder can be impaired such that it experiences increased mechanical loads that lead to early maintenance for the bearing. Thus, it is desirable to provide a robust seal that protects the bearing from the infiltration from outside contaminants. Also, it may be desirable to seal in any lubricant that may help prolong the useful life of the joint in certain applications.

Various seal designs have been developed to address these issues. For example, U.S. Pat. Application Publ. No. 2016/0097454A1 to Chapagain et al. discloses a seal member for a joint between a pivot member movable about a rotational axis of a shaft that includes a ring, a flange, and a resiliently flexible intermediate portion interposed between the ring and the flange. The ring includes an annular distal and proximal ring faces disposed in spaced relationship to each other along a longitudinal axis. The flange may include a pair of flange faces disposed in spaced relationship to each other along the longitudinal axis. The flange may include an outer and an inner flange surface extending along the longitudinal axis between the pair of flange faces at, respectively, the outer and inner flange perimeters thereof. The intermediate portion is connected to the proximal ring face of the ring and to the inner circumferential flange surface of the flange such that the ring is relatively movable with respect to the flange.

Continuous improvement of such seals is warranted such that the seals are easy to install and manufacture, as well as be robust enough to withstand the pressure exerted on them externally by mud packing, etc.

SUMMARY

A seal according to a first embodiment of the present disclosure includes an at least partially cylindrical annular body defining a radial direction, an axial direction, and a circumferential direction. The at least partially cylindrical annular body may have a radially outer flange, a radially inner ring, and a resilient intermediate portion joining the radially outer flange to the radially inner ring. The radially outer flange defines a seal outer diameter and a flange axial thickness, and a ratio of the seal outer diameter to the flange axial thickness ranges from 14.0 to 15.0.

A seal according to a second embodiment of the present disclosure includes an at least partially cylindrical annular body defining a radial direction, an axial direction, and a circumferential direction. The at least partially cylindrical annular body may have a radially outer flange, a radially inner ring, and a resilient intermediate portion joining the radially outer flange to the radially inner ring. The radially outer flange defines a flange inner diameter, the radially outer flange also includes a flange front axial face, and a flange rear axial face. The radially outer flange further defines a flange notch with a flange notch bottom surface extending from the flange front axial face to the flange inner diameter.

A seal according to a third embodiment of the present disclosure includes an at least partially cylindrical annular body defining a radial direction, an axial direction, and a circumferential direction. The at least partially cylindrical annular body may have a radially outer flange, a radially inner ring, and a resilient intermediate portion joining the radially outer flange to the radially inner ring. The radially inner ring defines a seal inner diameter and includes a ring front axial face. The resilient intermediate portion defines a resilient intermediate portion notch that includes a radial surface extending from the seal inner diameter, and an axial surface extending from the radial surface to the ring front axial face. The resilient intermediate portion also includes a skirt portion extending axially from the ring front axial face past the radial surface.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a seal design that may be used for a joint between a pivot member movable about a rotational axis of a shaft are provided according to various principles of the present disclosure. The seal may prevent dirt or debris from entering into the joint and/or may keep lubricant within the joint, etc.

Figure 1:
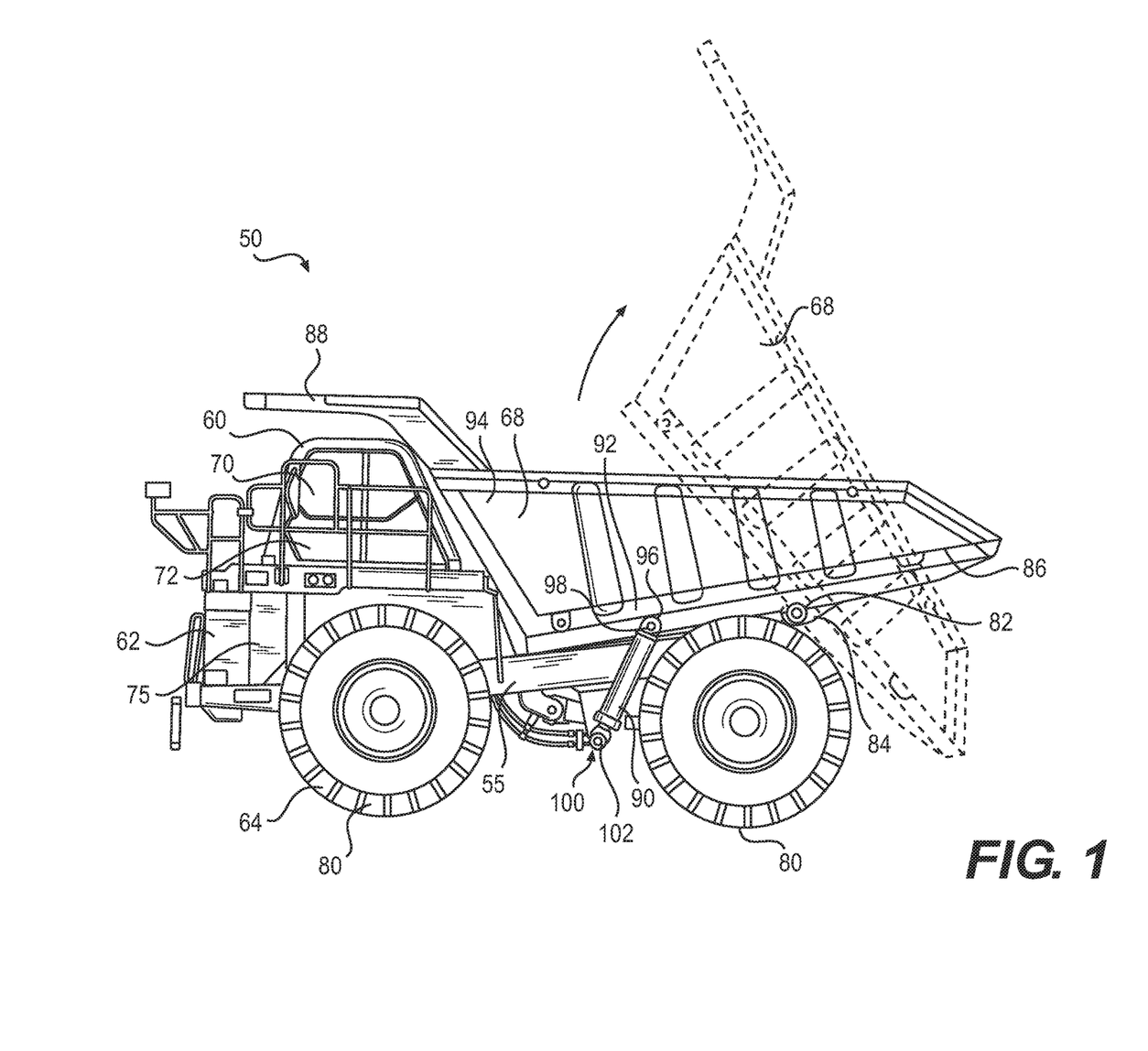
FIG. 1 is a side view of a machine in the form of an off-highway truck suitable for use with a joint assembly using a seal design according to an embodiment of the present disclosure.

Starting with FIG. 1, an exemplary embodiment of a machine 50 in the form of an off-highway truck. In the illustrated embodiment, the machine is a large self-propelled off-highway vehicle capable of carrying tons of material in operations such as mining and the like. The machine 50 has a chassis 55 which supports an operator station 60, a power system 62, a drive system 64, and a dump body 68.

In other embodiments, the machine 50 can be any other suitable machine for use with a joint assembly having a seal design constructed in accordance with principles of the present disclosure. Examples of such machines include mobile or fixed machines used for construction, farming, mining, forestry, earth moving, transportation, and other similar industries. In some embodiments, the machine can be an excavator, wheel loader, backhoe, crane, compactor, dozer, wheel tractor-scraper, material-handling machine, or any other suitable machine which includes a joint assembly with a seal.

The operator station 60 may include controls for operating the machine 50 via the power system 62. The illustrated operator station 60 is configured to define an interior cabin 70 within which the operator controls are housed and which is accessible via a door 72. Specifically, the operator station 60 can include one or more operator interface devices configured for use by a machine operator to maneuver the machine 50 and perform tasks with the machine 50, for example. Examples of operator interface devices include, but are not limited to, a joystick, a steering wheel, and/or a pedal as are well known and understood in the industry.

The power system 62 may be configured to supply power to the machine 50. The power system 62 is operably arranged with the operator station 60 to receive control signals from the controls in the operator station 60 and with the drive system 64 and the dump body 68 to selectively operate the drive system 64 and/or the dump body 68 according to control signals received from the operator station 60. The power system 62 is adapted to provide operating power for the propulsion of the drive system 64 and the operation of the dump body 68 as is understood by those having ordinary skill in the art.

In embodiments, the power system 62 may include an engine, a cooling system or package, a transmission, and a hydraulic system, for example, housed at least in part within an engine compartment 75 supported by the chassis 55. In embodiments, the engine can be any suitable engine, such as, an internal combustion engine, a diesel engine, a gasoline engine, a gaseous fuel-powered engine or any other type of suitable engine. In embodiments, the power system 62 can include a number of engines. The cooling system can be configured to cool the engine(s) of the power system 62.

The hydraulic system may include a plurality of components such as pumps, valves, and conduits, along with a hydraulic fluid reservoir (not shown). The hydraulic system, as well as other systems in the machine, may include its own cooling arrangement.

The drive system 64 may be in operable arrangement with the power system 62 to selectively propel the machine 50 via control signals sent through the operator station 60. The drive system 64 can include a plurality of ground-engaging members, such as, wheels 80 as shown in the illustrated embodiment, which can be movably connected to the chassis 55 through axles, drive shafts or other components (not shown). In embodiments, the drive system 64 can be provided in the form of a track-drive system, a wheel-drive system, or any other type of drive system configured to propel the machine 50.

The dump body 68 defines a storage compartment configured to carry a payload, such as mined material, for example, within it. The dump body 68 is pivotably attached to the chassis 55 by a pair of pivot pins 82 respectively extending through a pair of body supports 84 projecting form the dump body 68 and located toward a rear end 86 of the dump body 12, one on each side of the dump body 68. The pivot pins 82 define a dump body pivot axis about which the dump body 68 can rotate relative to the chassis 55. The dump body 68 is movable over a range of travel between a storage position (shown in FIG. 1) and a fully-inclined dumping position (shown in dashed lines in FIG. 1).

The dump body 68 may include a canopy 88 that extends outwardly from the dump body 68 when the dump body 68 is in the storage position, as shown in FIG. 1. When the dump body 68 is in the storage position, the canopy 88 extends over the operator station 60 and is configured to protect the operator station from debris falling overhead during loading of the dump body 68.

In other embodiments, a different style of dump body 68 can be used. In embodiments, the dump body 68 can include a tailgate at the rear end 86 thereof which is adapted to move between an open position and a closed position.

In some embodiments, at least one actuator 90 is provided that is adapted to selectively move the dump body over the range of travel between the storage position and the fully-inclined dumping position. In some embodiments, the actuator 90 can be any suitable actuator, such as an extendable cylinder in the form of a hydraulic cylinder or a hydro-pneumatic cylinder, for example, as is well known to those skilled in the art. In embodiments, the machine 50 can include a single extendable cylinder, for example, a pair of extendable cylinders as is customary, or more than two cylinders to selectively pivot the dump body 68.

In the illustrated embodiment, a pair of actuators in the form of extendable cylinders 90 is provided. Each of the extendable cylinders 90 is pivotably connected to a respective side of the chassis 55 and the dump body 68. Each extendable cylinder 90 is moveable over a range of travel between a refracted position (as shown as solid lines in FIG. 1) and an extended position (as shown as dotted lines in FIG. 1) to place the dump body 68 in the storage position and the fully-inclined position, respectively.

A pair of cylinder brackets 92 may be provided between a front end 94 of the dump body 68 and the body supports 84. Each cylinder bracket 92 is adapted to receive an upper end 96 of one of the extendable cylinders 90, which can be pivotably mounted thereto via a pin 98, for example. A pair of joint assemblies 100 constructed in accordance with principles of the present disclosure is provided to pivotably mount a lower end 102 of a respective extendable cylinder 90 to the chassis 55.

In the illustrated embodiment, when the cylinders 90 are in the retracted position, the dump body 68 is in the storage position for receiving payload therein. When the cylinders 90 are in the extended position, the front end 94 of the dump body 68 is raised relative to the chassis 55 to pivot the dump body 68 about the pivot axis to one of a series of dumping positions up to the fully-inclined dumping position for expelling the payload stored within the dump body 68 from the rear end 86 thereof. This movement of dump body 68 can be controlled using an operator interface device housed in the operator station 60 in a conventional manner.

Figure 2:
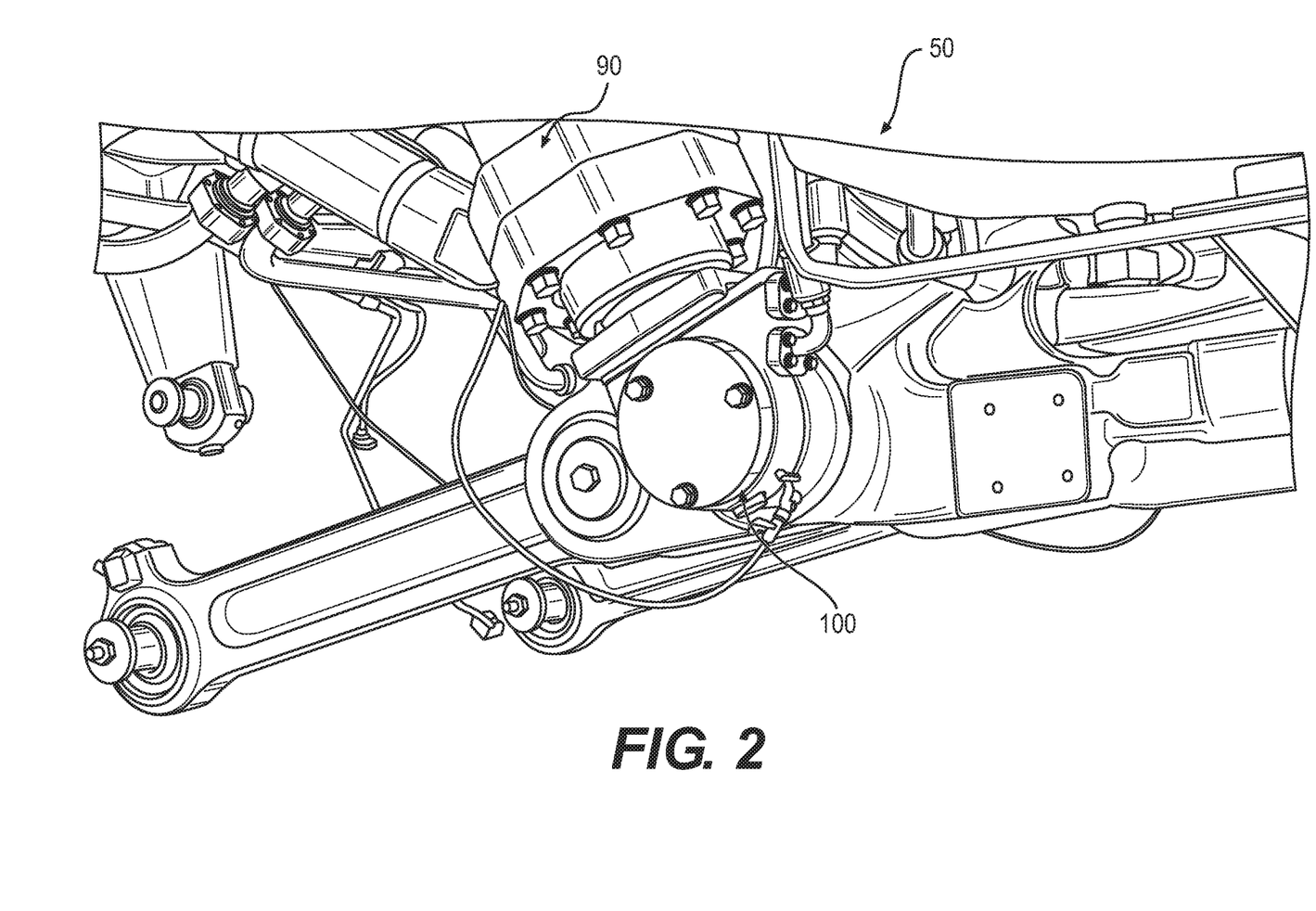
FIG. 2 is an enlarged perspective view of the joint assembly of FIG. 1.

Referring now to FIG. 2, an instance of the joint assembly 100 and its attachment to a cylinder 90 is shown. Various lubrication lines are also shown but it is to be understood that any of the embodiments of the seal design mentioned herein may be used in either a "dry" lube or "wet" lube joint application.

Figure 3:
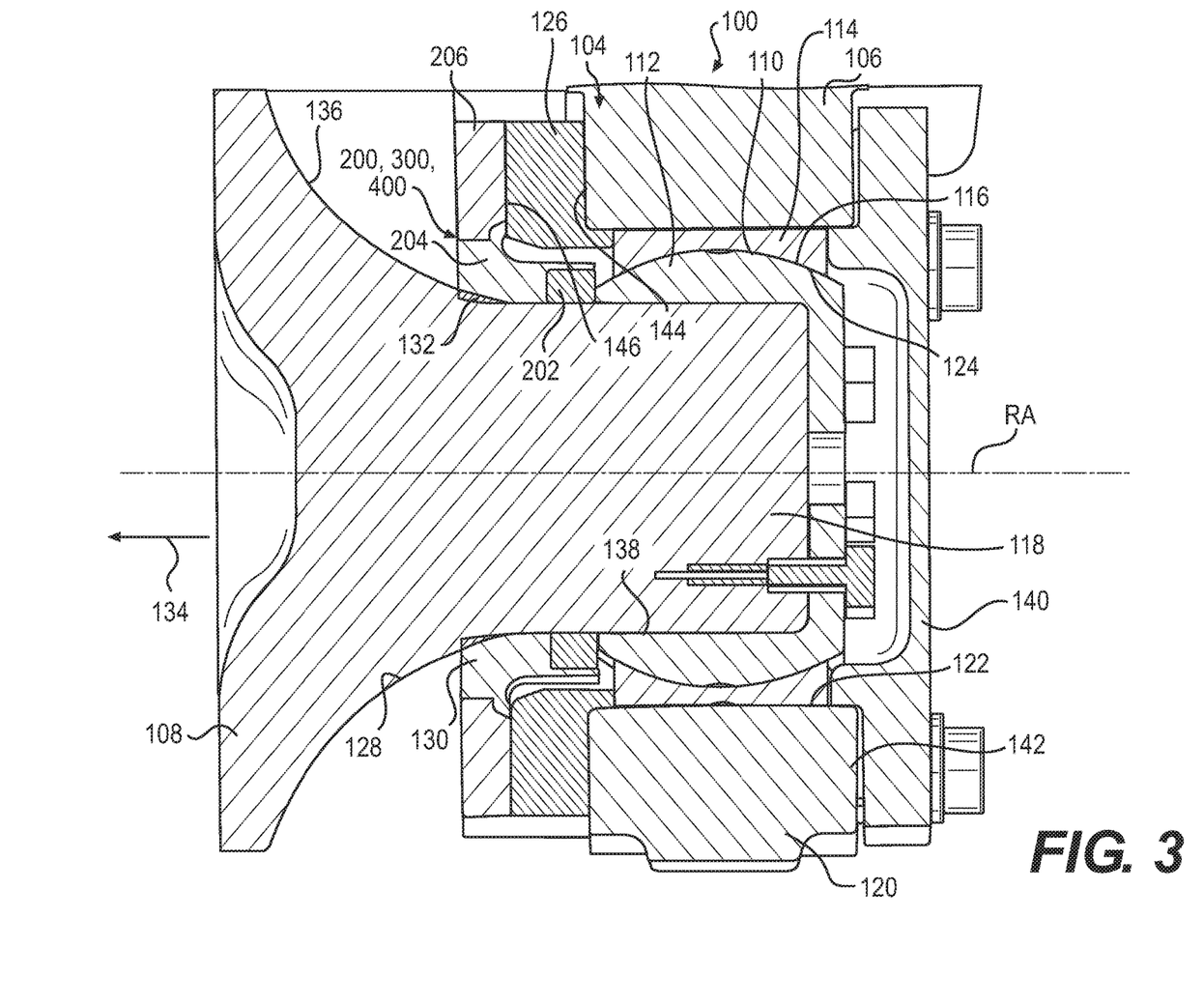
FIG. 3 is a cross-sectional view of the joint assembly of FIG. 2.

FIG. 3 depicts the interior of the joint assembly 100. The joint assembly 100 may comprise a bearing 104 that is provided to facilitate the relative movement of a pivot member 106 and a shaft 108. The bearing 104 may define a bearing interface 110 about which the pivot member 106 is pivotable with respect to the shaft 108.

The illustrated bearing 104 may include an inner ring bearing member 112 and an outer race bearing member 114. The inner ring bearing member 112 has a spherically convex exterior bearing surface 116. The inner ring bearing member 112 may be configured to be mounted to the distal end 118 of the shaft 108. The inner ring bearing member 112 can include inner ring mounting holes corresponding to and aligning with the bearing mounting holes in the distal end 118 of the shaft 112.

The outer race bearing member 114 may be attached to the mounting head 120 of the extendable cylinder 90. The outer race bearing member 114 may be disposed within the inner circumferential mounting head surface 122.

The outer race bearing member 114 may have a spherically concave interior bearing surface 124 defining a cavity therewithin. The concave interior bearing surface 124 of the outer race bearing member 114 may include a shape that is complementarily to that of the convex exterior bearing surface 116 of the inner ring bearing member 112.

The inner ring bearing member 112 may be disposed within the cavity of the outer race bearing member 114 with the spherically concave interior bearing surface 124 of the outer race bearing member 114 concentrically circumscribing the spherically convex exterior bearing surface 116 of the inner ring bearing member 112. The spherically convex exterior bearing surface 116 of the inner ring bearing member 112 and the spherically concave interior bearing surface 124 of the outer race bearing member 114 may define the bearing interface 110.

In some embodiments, seals (such as those shown and described in U.S. Pat. No. 6,626,575, for example) can be provided on both sides of the outer race bearing member 114 that help seal the bearing interface 110. In some embodiments, one or both of the convex exterior bearing surface 116 of the inner ring bearing member 112 and the concave interior bearing surface 124 of the outer race bearing member 114 may have a friction-reducing liner applied thereto. In embodiments, the friction-reducing liner can be made from any suitable material, such as, PTFE, for example.

With continued reference to FIG. 3, the joint assembly 100 is shown in an assembled configuration. To assemble the joint assembly 100, the bearing 104 may be mounted to the extendable cylinder 90 (best seen in FIG. 2). A seal member 200, 300, 400 and the inner retention ring 126 may rest on the shaft 108.

Still looking at FIG. 3, a slight clearance between the radially inner ring 202 of the seal 200, 300, 400 and the shaft 112 allow the seal 200, 300, 400 to be mounted onto the shaft 108 from the distal end 118 thereof. The taper portion 128 of the inner shaft engagement surface 130 of the seal 200, 300, 400 may act in the manner of a countersink to facilitate the insertion of the distal end 118 of the shaft 108 through the intermediate passage 132. The seal 200, 300, 400 may move along the rotational axis "RA" in the inboard direction 134 until the taper portion 128 seats against the concave taper surface 136 of the shaft 108. In some embodiments, a lubricant may be applied to the exterior surface 138 of the shaft 108 to facilitate the translation of the resilient intermediate portion 204 along the rotational axis "RA" of the shaft 108 into the position shown in FIG. 3.

The inner ring bearing member 112 of the bearing 104 is then seated onto the distal end 118 of the shaft 108. The inner ring bearing member 112 may be moved relative shaft along the rotational axis "RA" in the inboard direction 134 and the inner ring bearing member 112 may be rotated relative to the rotational axis "RA" to align the mounting holes in the inner ring bearing member 112 with the bearing mounting holes in the shaft 108. The inner ring bearing member 112 can then be connected to the distal end 118 of the shaft 108 using suitable fasteners.

The outer seal cover 140 can be assembled to the outboard side 142 of the pivot member 106. The inner retention ring 126 and the seal 200, 300, 400 can be bolted together to the inboard side 144 of the pivot member 106. With the radially outer flange 206 of the seal 200, 300, 400 secured to the pivot member 106, the radially inner ring 202 of the seal 200, 300, 400 is in contacting relationship with the bearing 104 and the resilient intermediate portion 204 is in interfering, sealing relationship with the exterior surface 138 of the shaft 108, as shown in FIG. 3. At the same time, the sealing bead 324 (best seen in FIG. 6) of the resilient intermediate portion 204 of the seal 200, 300, 40 may create a seal at the seam 146 disposed axially between the radially outer flange 206 of the seal 200, 300, 400 and the inner retention ring 126.

A seal 200 according to a first embodiment of the present disclosure will now be discussed looking at FIG. 4 thru 11. Focusing on FIG. 4 thru 6, the seal 200 may comprise an at least partially cylindrical annular body 208 defining a radial direction 8208, an axial direction A208, and a circumferential direction C208. As alluded to earlier herein, the at least partially cylindrical annular body 208 may include a radially outer flange 206, a radially inner ring 202, and a resilient intermediate portion 204 joining the radially outer flange 206 to the radially inner ring 202.

Figure 4:
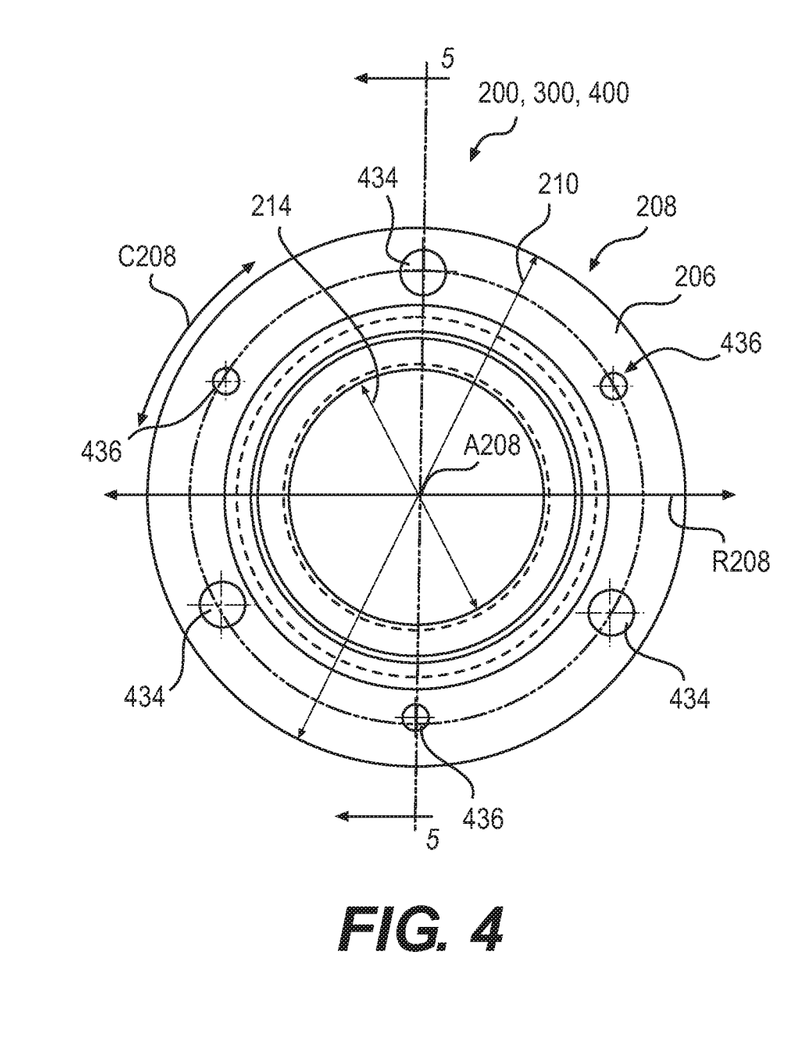
FIG. 4 is a front view of a seal design of FIG. 3.
Figure 8:
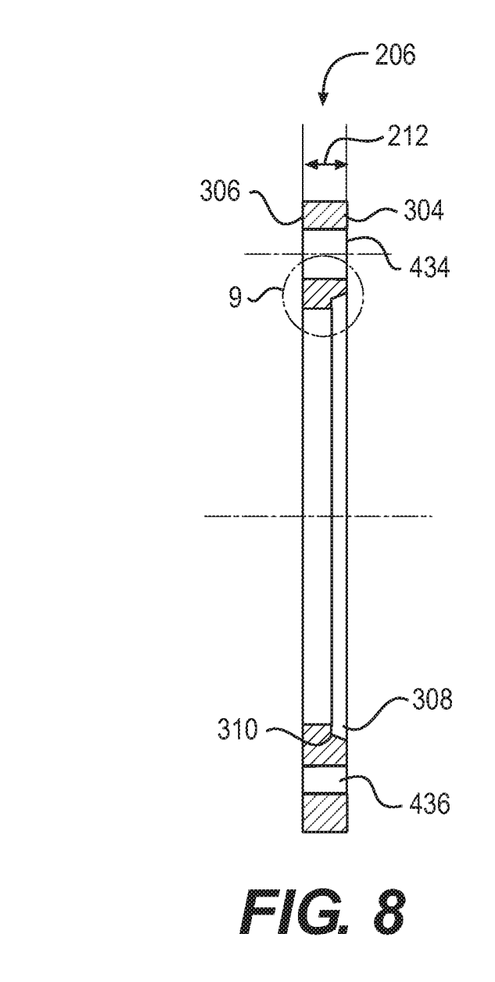
FIG. 8 is a cross-sectional view of the radially outer flange of FIG. 7 taken along lines 8-8 thereof.

As best seen in FIGS. 4 and 8, the radially outer flange 206 may define a seal outer diameter 210 and a flange axial thickness 212. A ratio of the seal outer diameter 210 to the flange axial thickness 212 may range from 14.0 to 15.0 (e.g. approximately 14.5). In such an embodiment, the flange axial thickness 212 may range from 11 mm to 13 mm (e.g. approximately 12 mm) and the seal outer diameter may range from 173 mm to 177 mm (e.g. approximately 175 mm). Other ratios and dimensions are possible in other embodiments.

Figure 5:
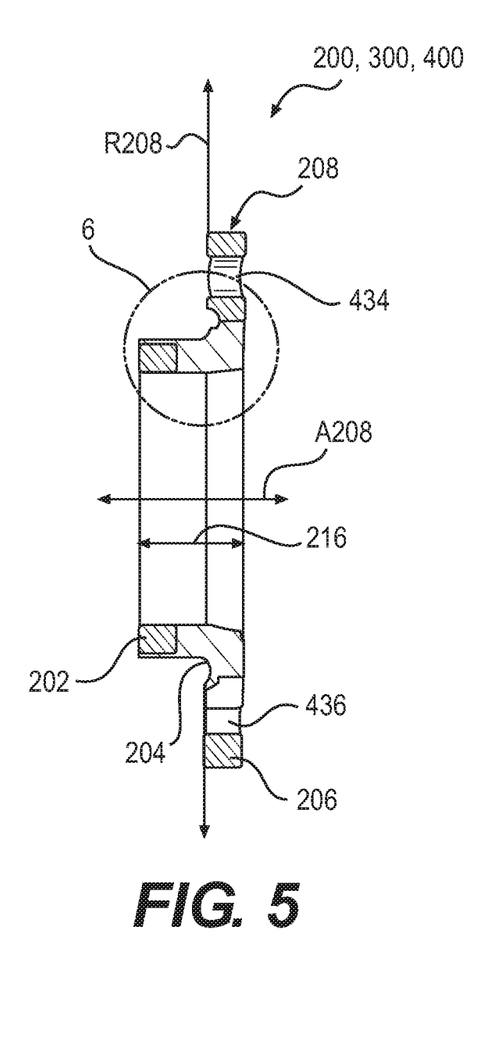
FIG. 5 is a cross-sectional view of the seal design of FIG. 4 taken along lines 5-5 thereof.

Looking at FIGS. 4 and 5, the radially inner ring 202 may define a seal inner diameter 214 ranging from 80 mm to 86 mm (e.g. approximately 83 mm), and the seal 200 may define an overall seal axial thickness 216 ranging from 33 mm to 35 mm (e.g. approximately 34 mm).

The radially outer flange 206, the radially inner ring 202, and the resilient intermediate portion 204 may be made from various suitable materials. In this embodiment, the radially outer flange 206 and the radially inner ring 202 are more rigid (measurable via a higher surface hardness) than the resilient intermediate portion 204. In such a case, the radially outer flange 206 may comprise a steel material, the radially inner ring 202 may include a nylon material, and the resilient intermediate portion 204 may include a rubber material. In such a case, the rubber material may be molded onto the steel material and onto the nylon material. Other materials and material properties are possible in other embodiments. Also, the seal 200 may be manufactured or assembled in other manners. For example, the radially outer flange, the radially inner ring, and the resilient intermediate portion may be nested one onto another and/or be supplied as separate components in a kit, etc.

A seal 300 according to another embodiment of the present disclosure will now be discussed with reference to FIG. 4 thru 9. The seal 300 may comprise an at least partially cylindrical annular body 208 defining a radial direction R208, an axial direction A208, and a circumferential direction C208. The at least partially cylindrical annular body 208 may include a radially outer flange 206, a radially inner ring 202, and a resilient intermediate portion 204 joining the radially outer flange 206 to the radially inner ring 202.

Figure 7:
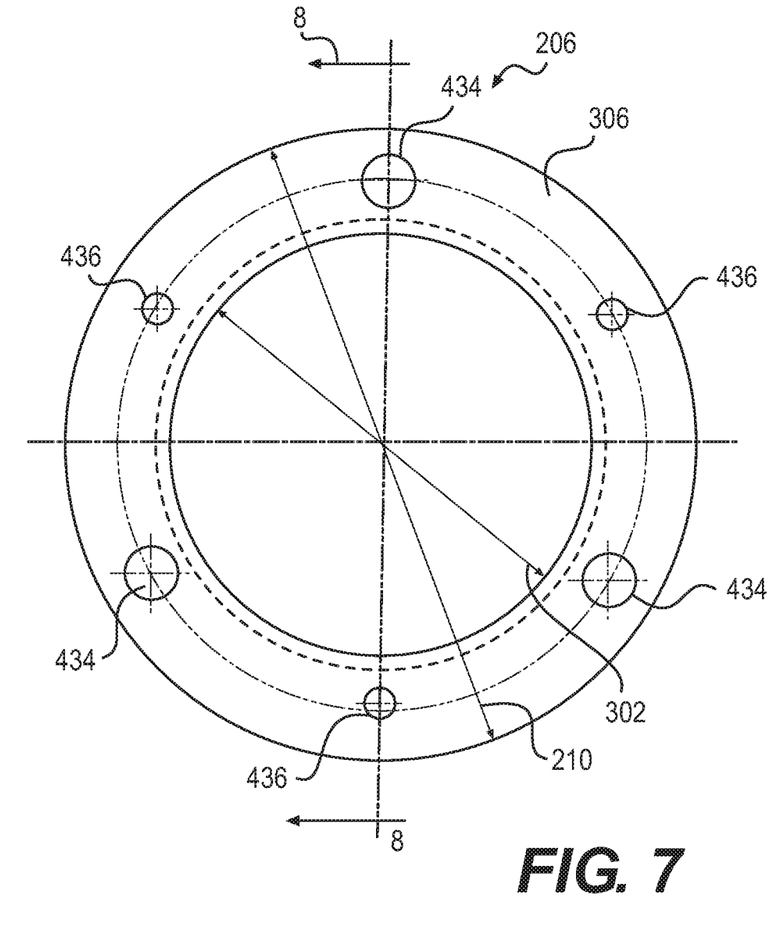
FIG. 7 is a rear view of the radially outer flange of FIG. 6 shown in isolation from the radially inner ring and the resilient intermediate portion.
Figure 9:
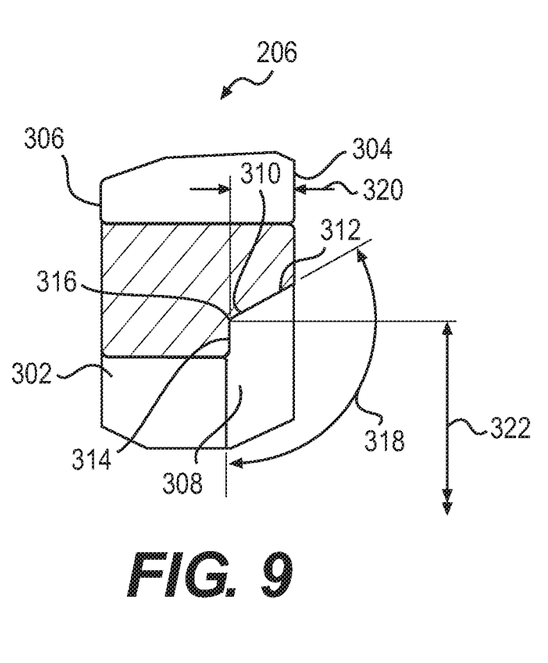
FIG. 9 is an enlarged detail view of the top portion of the radially outer flange of FIG. 8.
Figure 10:
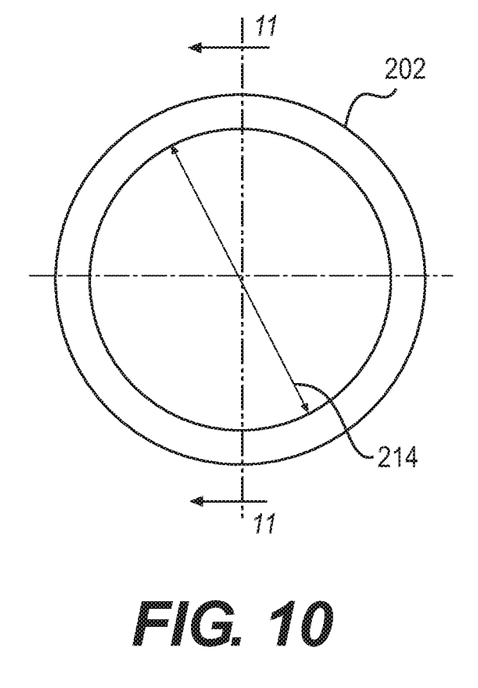
FIG. 10 is a front view of radially inner ring of FIG. 7 shown in isolation from the radially outer flange and the resilient intermediate portion.

Focusing on FIG. 7 thru 9, the radially outer flange 206 defines a flange inner diameter 302, and includes a flange front axial face 304, and a flange rear axial face 306. As best seen in FIGS. 8 and 9, the radially outer flange 206 may further define a flange notch 308 with a flange notch bottom surface 310 extending from the flange front axial face 304 to the flange inner diameter 302.

In FIG. 9, the flange notch bottom surface 310 includes an inclined portion 312, and a radial portion 314 that meet at an intersection point 316. The inclined portion 312 may extend from the flange front axial face 304, while the radial portion 314 may extend from the intersection point 316 to the flange inner diameter 302. The inclined portion 312 forms an obtuse notch angle 318 with the radial portion 314, and the flange notch 308 defines a flange notch axial depth 320 measured from the flange front axial face 304 to the radial portion 314. Other configurations are possible in other embodiments.

For the embodiment shown, the obtuse notch angle 318 ranges from 115 degrees to 125 degrees (e.g. approximately 120 degrees), the flange notch axial depth 320 ranges from 3.75 mm to 4.25 mm (e.g. approximately 4 mm), and the intersection point 316 defines an intersection point diameter 321 that ranges from 118 mm to 122 mm (e.g. approximately 120 mm). Other dimensional ranges are possible in other embodiments.

Referring back to FIG. 6, the resilient intermediate portion 204 may include a tab 322 that is at least partially complimentarily configured to fit in the flange notch 308. The tab 322 may include a sealing bead 324 extending axially proud of the flange front axial face 304. The sealing bead 324 may include a convex radius 326 that defines convex radius center 328 that is substantially radially aligned (e.g. within +/−0.5 mm) with the intersection point 316 of the flange notch 308 and that is substantially axially aligned (e.g. within +/−1 mm) with the flange front axial face 304. Other configurations for these features are possible in other embodiments.

Figure 6:
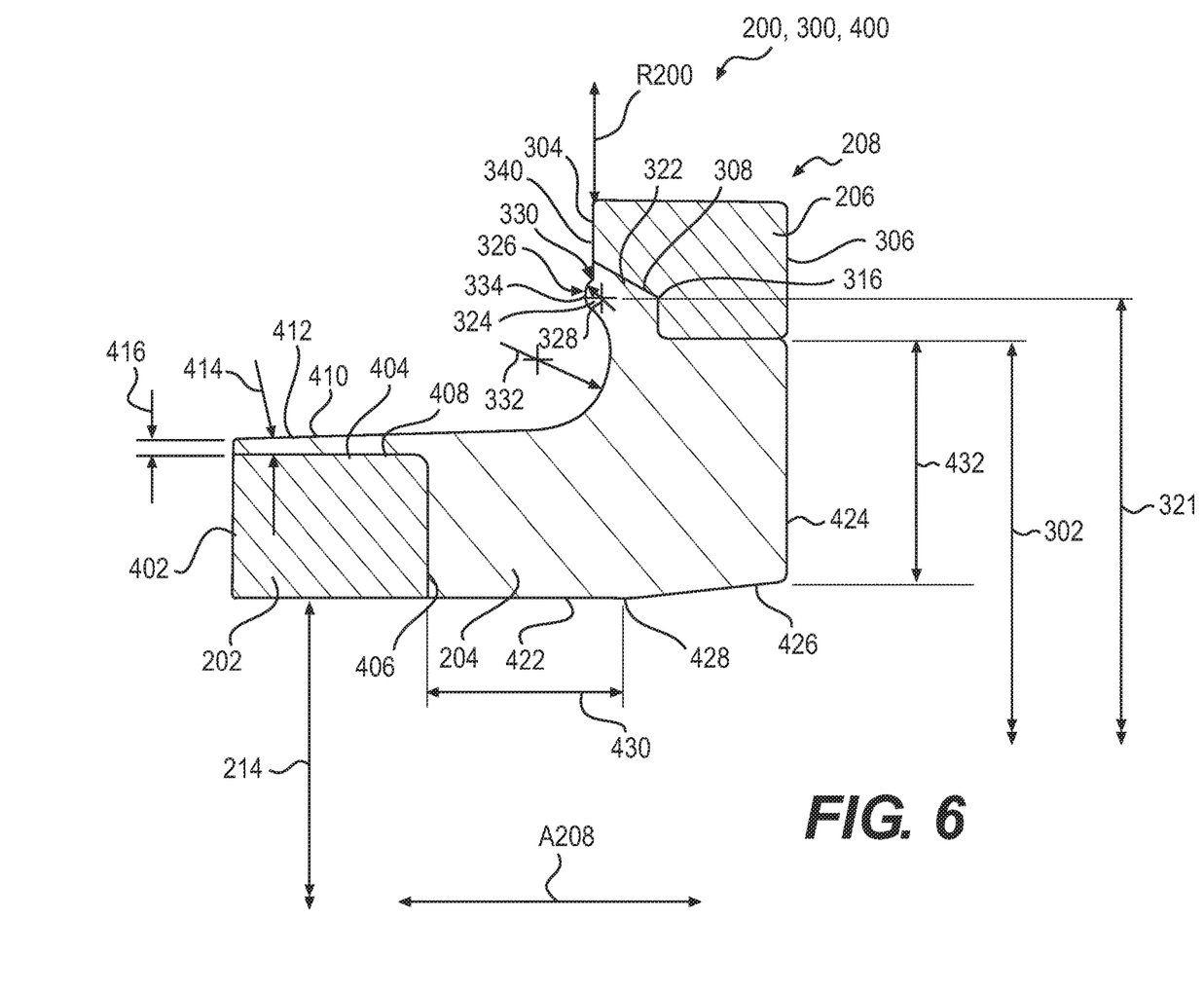
FIG. 6 is an enlarged detail view of the seal design of FIG. 5, illustrating the top portion of the cross-sectional geometry of the radially inner ring, the radially outer flange, and the resilient intermediate portion of the seal design more clearly.

In addition, the resilient intermediate portion 204 further includes a radially outer concave radius 330 and a radially inner concave radius 332. The radially outer concave radius 330 extends radially outward from the convex radius 326 of the sealing bead 324, while the radially inner concave radius 332 extends radially inward from the convex radius 326 of the sealing bead 324. Also, the radially outer concave radius 330 may be tangent to the convex radius 326, and the radially inner concave radius 332 may also be tangent to the convex radius 326. The radially outer concave radius 332 may transition to an upper axial surface 340 that terminates radially and axially proximate to flange front axial face 304. Other configurations for these features are possible in other embodiments.

The convex radius 326 may define a convex radius of curvature 334 ranging from 0.5 mm to 1.5 mm (e.g. approximately 1 mm), the radially outer concave radius 330 may define a radially outer concave radius of curvature 336 ranging from 0.2 mm to 0.3 mm (e.g. approximately 0.25 mm), and the radially inner concave radius 332 may define a radially inner concave radius of curvature 338 ranging from 4 mm to 5 mm (e.g. approximately 4.4 mm). Other dimensional values for these features are possible in other embodiments.

With continued reference to FIG. 6, a third embodiment of a seal 400 according to the principles of the present disclosure will now be discussed. The seal 400 may comprise an at least partially cylindrical annular body 208 defining a radial direction R208, an axial direction A208, and a circumferential direction C208. The at least partially cylindrical annular body 208 may include a radially outer flange 206 including a flange front axial face 304 and a flange rear axial face 306. The body 208 may also include a radially inner ring 202, and a resilient intermediate portion 204 joining the radially outer flange 206 to the radially inner ring 202.

The radially inner ring 202 may define a seal inner diameter 214 and may include a ring front axial face 402. The resilient intermediate portion 204 may define a resilient intermediate portion notch 404 that includes a radial surface 406 extending from seal inner diameter 214, and an axial surface 408 extending from the radial surface 406 to the ring front axial face 402. The resilient intermediate portion 204 may also include a skirt portion 410 extending axially from the ring front axial face 402 past the radial surface 406.

The skirt portion 410 may define a radially outer surface 412 that is drafted relative to the axial direction A208, forming a draft angle 414. The draft angle 414 may range from 0.5 degrees to 1.5 degrees (e.g. approximately 1 degree). The skirt portion 410 may define a skirt radial thickness 416 ranging from 0.75 mm to 1.25 mm (e.g. approximately 1 mm). The radially inner concave radius 332 may also be tangent to the radially outer surface 412 of the skirt portion 410.

Figure 11:
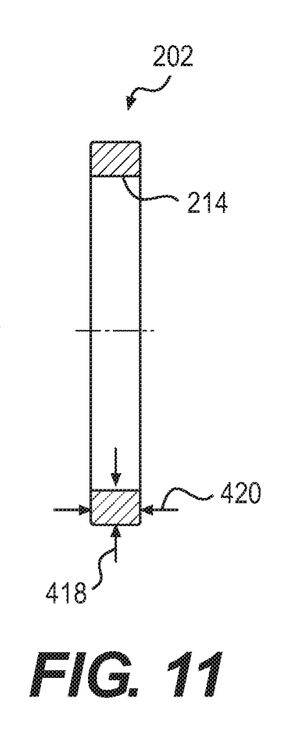
FIG. 11 is a cross-sectional view of the radially inner ring of FIG. 10 taken along taken along lines 11-11 thereof.

In FIG. 11, the radially inner ring 202 may define a ring radial thickness 418 ranging from 8 mm to 10 mm (e.g. approximately 9 mm), and a ring axial thickness 420 ranging from 11 mm to 13 mm (e.g. approximately 12 mm).

Referring again to FIG. 6, the resilient intermediate portion 204 defines a resilient intermediate portion radially inner surface 422 that is substantially radially aligned (e.g. within +/−0.1 mm) with the seal inner diameter 214, a resilient intermediate portion axial rear surface 424 that is substantially axially aligned (e.g. within +/−0.1 mm) with the flange rear axial face 306. A sealing surface 426 may extend axially from the resilient intermediate portion axial rear face 424 to the resilient intermediate portion radially inner surface 422, meeting therewith at a transition point 428 disposed axially between the flange front axial face 304 and the flange rear axial face 306. The transition point 428 may be spaced axially away from the flange front axial face 304 a predetermined axial distance 430 ranging from 1.8 mm to 2.0 mm (e.g. approximately 1.9 mm). The radial dimension 432 of the resilient intermediate portion axial rear face 424 may range from 14 mm to 16 mm (e.g. approximately 15 mm).

Again, any of the materials, material properties, dimensions, ratios, configurations, etc. discussed herein may be varied as needed or desired to be different than any value or characteristic specifically mentioned herein or shown in the drawings for any of the embodiments.

INDUSTRIAL APPLICABILITY

In practice, a seal, any component of the seal, and/or a machine using any embodiment disclosed herein may be sold, bought, manufactured or otherwise obtained in an OEM (original equipment manufacturer) or after-market context. In particular, the seals may be provided so that they can be inserted into joint assemblies already in the field. That is to say, the joint assemblies already in the field may be retrofitted with the seals disclosed herein.

It is to be understood that any embodiment of the seal discussed herein may have a substantially consistent cross-section take through a plane containing the radial and axial directions (e.g. see FIG. 5). Thus, the seal may be modeled via CAD (computer aided design) to a large extent by rotating the cross-section in FIG. 6 about the axial direction A208.

Various features discussed earlier herein including the tab and draft of the skirt may be provided to aid in manufacturing. The tab and flange notch may allow de-flashing, without the fear of tearing, or the need of trimming the area near the tab after molding. The draft of the skirt may aid in demolding, etc.

Other features are provided for alignment and fastening. These features include fastener clearance holes 434 and dowel pin holes 436 (see FIGS. 4, 5, 7 and 8).

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A seal comprising:
    an at least partially cylindrical annular body defining a radial direction, an axial direction, and a circumferential direction; the at least partially cylindrical annular body including
        a radially outer flange;
        a radially inner ring; and
        a resilient intermediate portion joining the radially outer flange to the radially inner ring;
    wherein the radially outer flange defines a seal outer diameter and a flange axial thickness, and a ratio of the seal outer diameter to the flange axial thickness ranges from 14.0 to 15.0,
    wherein the radially outer flange and the radially inner ring are more rigid than the resilient intermediate portion, the radially outer flange forms a radially outer interface with the resilient intermediate portion that includes a plurality of surfaces and the radially inner ring forms a radially inner interface with the resilient intermediate portion that includes another plurality of surfaces.

2. The seal of claim 1 wherein the radially outer flange comprises a steel material, the radially inner ring comprises a nylon material, and the resilient intermediate portion includes a rubber material.

3. The seal of claim 2 wherein the rubber material is molded onto the steel material and onto the nylon material.

4. The seal of claim 1 wherein the flange axial thickness ranges from 11 mm to 13 mm and the seal outer diameter ranges from 173 mm to 177 mm.

5. The seal of claim 4 wherein the radially inner ring defines a seal inner diameter ranging from 80 mm to 86 mm, and the seal defines an overall seal axial thickness ranging from 33 mm to 35 mm.

6. A seal comprising:
    an at least partially cylindrical annular body defining a radial direction, an axial direction, and a circumferential direction; the at least partially cylindrical annular body including
        a radially outer flange;
        a radially inner ring; and
        a resilient intermediate portion joining the radially outer flange to the radially inner ring;
    wherein the radially outer flange defines a flange inner diameter, the radially outer flange also includes a flange front axial face, and a flange rear axial face, the radially outer flange further defining a flange notch with a flange notch bottom surface extending from the flange front axial face to the flange inner diameter.

7. The seal of claim 6 wherein the flange notch bottom surface includes an inclined portion and a radial portion that meet at an intersection point, the inclined portion extending from the flange front axial face, and the radial portion extending from the intersection point to the flange inner diameter.

8. The seal of claim 7 wherein the inclined portion forms an obtuse notch angle with the radial portion, and the flange notch defines a flange notch axial depth measured from the flange front axial surface to the radial portion.

9. The seal of claim 8 wherein the obtuse notch angle ranges from 115 degrees to 125 degrees, the flange notch axial depth ranges from 3.75 mm to 4.25 mm, and the intersection point defines an intersection point diameter that ranges from 118 mm to 122 mm.

10. The seal of claim 9 wherein the resilient intermediate portion includes a tab that is at least partially complimentarily configured to fit in the flange notch.

11. The seal of claim 10 wherein the tab further includes a sealing bead extending axially proud of the flange front axial face.

12. The seal of claim 11 wherein the sealing bead includes a convex radius that defines a convex radius center that is substantially radially aligned with the intersection point of the flange notch and is substantially axially aligned with the flange front axial face.

13. The seal of claim 12 wherein the resilient intermediate portion further includes a radially outer concave radius and a radially inner concave radius, the radially outer concave radius extending radially outward from the convex radius of the sealing bead, and the radially inner concave radius extending radially inward from the convex radius.

14. The seal of claim 13 wherein the convex radius defines a convex radius of curvature ranging from 0.5 mm to 1.5 mm, the radially outer concave radius defining a radially outer concave radius of curvature ranging from 0.2 mm to 0.3 mm, and the radially inner concave radius defining a radially inner concave radius of curvature ranging from 4 mm to 5 mm.

15. The seal of claim 13 wherein the radially outer concave radius is tangent to the convex radius, and the radially inner concave radius is tangent to the convex radius.

16. A seal comprising:
    an at least partially cylindrical annular body defining a radial direction, an axial direction, and a circumferential direction; the at least partially cylindrical annular body including
       a radially outer flange including a flange front axial face and a flange rear axial face;
       a radially inner ring; and
       a resilient intermediate portion joining the radially outer flange to the radially inner ring;
    wherein the radially inner ring defines a seal inner diameter and includes a ring front axial face, the resilient intermediate portion defines a resilient intermediate portion notch that includes a radial surface extending from the seal inner diameter, and an axial surface extending from the radial surface to the ring front axial face, the resilient intermediate portion also including a skirt portion extending axially from the ring front axial face past the radial surface.

17. The seal of claim 16 wherein the skirt portion defines a radially outer surface that is drafted relative to the axial direction, forming a draft angle.

18. The seal of claim 17 wherein the draft angle ranges from 0.5 degrees to 1.5 degrees, the skirt portion defines a skirt radial thickness ranging from 0.75 mm to 1.25 mm, the radially inner ring defines a ring radial thickness ranging from 8 mm to 10 mm and a ring axial thickness ranging from 11 mm to 13 mm.

19. The seal of claim 18 wherein the resilient intermediate portion defines a resilient intermediate portion radially inner surface that is substantially radially aligned with the seal inner diameter, a resilient intermediate portion axial rear face that is substantially axially aligned with the flange rear axial face, and a sealing surface extending axially from the resilient intermediate portion axial rear face to the resilient intermediate portion radially inner surface, meeting therewith at a transition point disposed axially between the flange front axial face and the flange rear axial face, and the transition point being spaced axially away from the flange front axial face a predetermined axial distance ranging from 1.8 mm to 2.0 mm.

* * * * *